(12) United States Patent
Geier et al.

(10) Patent No.: US 7,967,168 B2
(45) Date of Patent: Jun. 28, 2011

(54) PROCESS FOR CONTROLLING A DOSING DEVICE FOR LIQUID OR PASTY MEDIA; DOSING DEVICE; AND INDUSTRIAL ROBOT

(75) Inventors: Daniel Geier, Brühl (DE); Klaus Ehrle, Bürstadt (DE)

(73) Assignee: Hilger u. Kern GmbH, Mannheim (DE)

( * ) Notice: Subject to any disclaimer, the term of this patent is extended or adjusted under 35 U.S.C. 154(b) by 455 days.

(21) Appl. No.: 12/049,491

(22) Filed: Mar. 17, 2008

(65) Prior Publication Data
US 2008/0210706 A1 Sep. 4, 2008

Related U.S. Application Data

(63) Continuation of application No. PCT/EP2006/009055, filed on Sep. 18, 2006.

(30) Foreign Application Priority Data

Sep. 19, 2005 (DE) .......................... 10 2005 044 796

(51) Int. Cl.
*B67D 1/00* (2006.01)
*B67B 7/00* (2006.01)

(52) U.S. Cl. ................... 222/55; 222/1; 222/63; 901/43

(58) Field of Classification Search ................ 222/1, 63, 222/55, 61, 52; 901/43, 41, 30
See application file for complete search history.

(56) References Cited

U.S. PATENT DOCUMENTS

| | | | | |
|---|---|---|---|---|
| 5,046,666 A | * | 9/1991 | Ono | 239/73 |
| 5,319,568 A | * | 6/1994 | Bezaire | 700/123 |
| 5,376,062 A | * | 12/1994 | Zeichner | 483/55 |
| 5,429,682 A | * | 7/1995 | Harlow et al. | 118/681 |
| 5,521,477 A | * | 5/1996 | Sasaki | 318/568.18 |
| 5,658,615 A | * | 8/1997 | Hasebe et al. | 427/240 |
| 6,015,066 A | * | 1/2000 | Kimura et al. | 222/64 |

(Continued)

FOREIGN PATENT DOCUMENTS

DE 4123219 A1 1/1993

(Continued)

OTHER PUBLICATIONS

International Search Report, dated Mar. 29, 2007.

(Continued)

*Primary Examiner* — Kevin P Shaver
*Assistant Examiner* — Stephanie E Williams
(74) *Attorney, Agent, or Firm* — Laurence A. Greenberg; Werner H. Stemer; Ralph E. Locher

(57) ABSTRACT

A dosing apparatus includes a feed device for a liquid or pasty medium, which supplies the medium at a given preliminary pressure. A pressure control valve communicates with the feed device, a dosing pump is fluidically connected to the pressure control valve, a driving motor that drives the dosing pump, a discharge valve discharges the medium as a volume flow modifiable over time. A control and regulation device feeds a control signal to the pressure control valve in accordance with a predefined setpoint volume flow value. A comparator of the control and regulation device compares the input and output pressure values, and a control unit modifies the control signal fed to the pressure control valve in order to drive the difference between the input and output pressure values to a given value.

15 Claims, 1 Drawing Sheet

U.S. PATENT DOCUMENTS

| | | | |
|---|---|---|---|
| 6,056,998 A | 5/2000 | Fujimoto | |
| 6,089,469 A | 7/2000 | Fusama et al. | |
| 6,256,597 B1 * | 7/2001 | Wang et al. | 703/2 |
| 6,283,461 B1 * | 9/2001 | Joshi et al. | 261/142 |
| 6,540,104 B1 * | 4/2003 | Yanagita et al. | 222/1 |
| 7,066,352 B2 | 6/2006 | Ono et al. | |

FOREIGN PATENT DOCUMENTS

| | | |
|---|---|---|
| DE | 4318844 A1 | 12/1994 |
| DE | 29606710 U1 | 6/1996 |
| DE | 69814710 T2 | 3/2004 |
| DE | 69814532 T2 | 4/2004 |
| DE | 102004010774 A1 | 9/2004 |
| EP | 0116879 A1 | 8/1984 |
| GB | 2185785 A | 7/1987 |

OTHER PUBLICATIONS

German Patent and Trademark Search Report, dated Aug. 25, 2006.

* cited by examiner

PROCESS FOR CONTROLLING A DOSING DEVICE FOR LIQUID OR PASTY MEDIA; DOSING DEVICE; AND INDUSTRIAL ROBOT

CROSS-REFERENCE TO RELATED APPLICATIONS

This is a continuation, under 35 U.S.C. §120, of copending international application No. PCT/EP2006/009055, filed Sep. 18, 2006, which designated the United States; this application also claims the priority, under 35 U.S.C. §119, of German patent application No. DE 10 2005 044 796.1, filed Sep. 19, 2005; the prior applications are herewith incorporated by reference in their entirety.

BACKGROUND OF THE INVENTION

Field of the Invention

The invention relates to a process for controlling a dosing device for liquid or pasty media, as well as an industrial robot with such a dosing device.

In the process, a medium is conveyed by a feed device with a pre-set admission pressure and a pressure regulating valve placed downstream of it in flow terms, for controlling a dosing device of a dosing pump for a liquid or pasty medium, driven by a drive motor with a preset speed, especially a gear-wheel pump, which conveys the medium to an outlet valve, from which the medium is issued as a temporally changeable volume flow.

The dosing device for carrying out the process has a feed device for a liquid or pasty medium which makes the medium available with a preset admission pressure, to a pressure regulating valve flow-connected to the feed device, to a dosing pump flow-connected to the feed device, especially a toothed-wheel pump, to a drive motor that drives the dosing pump, to an outlet valve flow-connected with the dosing pump, by which [valve] the medium is issued as a temporally changeable volume flow, as well as with a control and regulation device, which transmits an adjustment signal to the pressure regulating valve in dependence on a pre-set volume flow setpoint value.

Dosing devices for precise dosing of liquid or pasty media such as adhesives, thickeners or other liquids or gels used in industrial production, are known in the state of the art. The known dosing devices here customarily comprise a dosing pump in the form of a toothed-wheel pump, which is driven by an rotary speed-controlled motor, and to which the medium to be dose-fed is conveyed by a feeding device such as in the form of a storage container, via an appropriate conduit. The dosing pump conveys the medium to an outlet valve, such as in the form of a changeable nozzle, which lays down the medium in forms such as that of a continuous bead on a tool or the like.

With known dosing devices the problem that results is that depending on the pressure of the medium upstream of the dosing pump and the pressure of the medium downstream of the dosing pump—as well also in dependence on the very size of the volume flow conveyed and the viscosity of the medium—a slippage arises in the dosing pump, which, depending on supply pressure of the fed medium and issued volume flow as well as the pump's speed, can assume a positive, or also a negative value. In known dosage systems, this slippage leads to a strong divergence possibly arising between the theoretical conveyed volume per unit of time pre-set as a volume flow setpoint value, for example, at a preset speed, and the actual volume flow emerging from the outlet valve, a strong divergence can arise, which, as a rule, can only be avoided by very expensive measurement and regulation devices, especially with use of a flow metering cell placed upstream of the dosing pump. In addition the slippage results in the dosing pump being subject to increased wear.

BRIEF SUMMARY OF THE INVENTION

It is accordingly an object of the invention to provide a method for controlling a dosing device for liquid or pasty media, a corresponding dosing device, and an industrial robot with the device, which overcome the above-mentioned disadvantages of the heretofore-known devices and methods of this general type. It is a further object to provide a dosing device that, especially in connection with an industrial robot, permits highly precise dosing of a liquid or pasty medium, and provides such a robot which also makes possible highly precise dosing of the medium even at high process speeds.

With the foregoing and other objects in view there is provided, in accordance with the invention, a method of controlling a dosing device for a liquid or pasty medium, the method which comprises:

conveying the medium by a feed device having a predetermined admission pressure and by a pressure regulating valve, downstream of the feed device in a direction of flow, of a dosing pump that is driven by a drive motor having a predetermined speed; and conveying the medium with the dosing pump (e.g., a gear-wheel pump) to an outlet valve, and issuing the medium from the outlet valve as a temporally changeable volume flow;

detecting a first pressure value of the medium upstream of the dosing pump;

detecting a second pressure value of the medium downstream of the dosing pump;

comparing the first pressure value and the second pressure value and altering a setting of the pressure-regulating valve so that a difference between the first pressure value and the second pressure value is driven to a predetermined value (preferably to zero);

storing, in the form of a characteristic curve, value pairs of different setpoint values of the volume flow and of respectively associated values of a setpoint signal, at which the difference between the first pressure value and the second pressure value corresponds to the predetermined value.

With the above and other objects in view there is also provided, in accordance with the invention, a dosing device for carrying out the above-outlined method, comprising:

a feed device for a liquid or pasty medium, the feed device providing the medium with a preset admission pressure;

a pressure regulating valve fluidically connected with the feed device, and a dosing pump fluidically connected with the pressure regulating valve;

a first pressure sensor disposed to detect a inlet-side pressure of the medium upstream of the dosing pump, and a second pressure sensor disposed to detect an outlet-side pressure of the medium downstream of the dosing pump;

a drive motor disposed to drive the dosing pump;

an outlet valve fluidically connected with the dosing pump and configured to issue the medium in a temporally changeable volume flow;

a control and regulation device connected to transmit an adjustment signal to the pressure regulating valve in dependence on a pre-set volume flow setpoint value, the control and regulation device containing:

a comparison unit for comparing the pressure values detected by the first and second pressure sensors;

a control unit for altering the adjustment signal transmitted to the pressure regulating valve so that a difference between the first pressure value and the second pressure value corresponds to a pre-set value; and a storage device storing characteristic curves containing value pairs from differing volume flow setpoint values and values assigned thereto for the adjustment signal for which the difference between the first and second pressure value corresponds to the pre-set value.

Finally, there is provided, in accordance with the invention, an industrial robot, particularly configured for applying adhesives or thickeners. The novel robot comprises:

a robot control device; and a dosing device as summarized above; and wherein the volume flow setpoint value transmitted to the control and regulation device is generated on the basis of a position- and/or velocity-dependent signal output by the robot control device.

In other words, according to the invention, in a process for controlling a dosing device for high-precision dosing of a liquid or pasty medium, the medium is conveyed by a feeding device, for example a known pressurized storage container, at a preset admission pressure to the inlet of a dosing pump preferably driven by a speed-controlled drive motor via an inline pressure regulator that is preferably embodied as a closed-loop pressure regulating valve, which governs the admission pressure independently to a substantially constant value. The dosing pump conveys the medium via a suitable conduit system to a known outlet valve, through which the medium is issued as a volume flow that can be temporally altered.

Using a first pressure sensor placed upstream of the dosing pump, preferably in the area of the inlet of the dosing pump, the pressure of the medium, and an initial pressure value connected with it, is detected. Virtually simultaneously with this, the pressure of the medium, or a second pressure value assigned to it, is detected by means of a second pressure sensor placed downstream of the dosing pump, preferably in its outlet area. The two pressure values are then compared with each other, and depending on the difference between the two pressure values, the pressure regulating valve is opened or closed so that the difference between the first pressure value and the second pressure value assumes a pre-set value that preferably corresponds to a pressure difference of the medium in the conduit of zero bar in the conduit upstream and downstream of the dosing pump.

Expressed another way, with the invention-specific process, by measuring and comparing the pressure upstream and downstream of the dosing pump, the pressure regulating valve is governed in such a way that slippage of the dosing pump preferably has a value of zero, although if desired, provision may be made that the difference between the first pressure value and the second pressure value assumes a value other than zero, which, however preferably is only slightly larger or smaller.

Due to use of the invention-specific process, an advantage arises in that due to the negligible pump slippage, the speed of the drive motor that drives the dosing pump is essentially proportional to the volume flow conveyed by the dosing pump. This in turn results in the volume flow being able very simply to be adjusted up or down to a new volume flow setpoint value (i.e., target value), by raising or lowering the speed of the drive motor to the appropriately proportional speed value.

According to another concept that is the basis of the invention, the adjustment signal that is transmitted to the pressure regulating valve is altered essentially simultaneously with the volume flow setpoint value, or the speed setpoint value proportional to it, if the latter is raised or lowered from a volume flow setpoint value of the moment to a new value. The adjustment signal, which is here transmitted to the pressure regulating valve, is preferably determined according to the invention on the basis of a pre-set characteristic curve that is stored, for example, in an electronic storage device. The characteristic curve here preferably comprises value pairs from differing volume flow setpoint values and adjusts these assigned values for the adjusting signal transmitted to the pressure regulating valve, for which there is set a pump slippage of zero or having the amount of the pre-set value.

For this, for example, when the invention-specific dosing device is first placed in operation to carry out the process, a first volume flow setpoint value can be inputted and the value for the pertinent adjustment signal, which is set if the pressure difference between the pressure values detected by the first pressure sensor and by the second pressure sensor has been adjusted after some time to a difference value of zero, is inputted into the storage device. By repeated inputs of additional volume flow setpoint values, and storage of the pertinent values for the adjustment signal, in this way a matching characteristic curve can be empirically adopted, stored and also compared with further values. Additionally, provision can be made that value pairs already contained in the characteristic curve during current operation of the invention-specific dosing device are overwritten by the current new values, to constantly update the characteristic curve, and accordingly to shorten the time until a new volume flow setpoint value is achieved.

By use of a characteristic curve obtained in the manner described above, or even a characteristic diagram with the latter of which for example also a parameter can be taken into account for the size of the opening of the outlet valve, the volume flow emerging from the outlet valve is obtained in a markedly shorter time and with a considerably higher precision to the desired new volume flow setpoint value. Through this a possibility arises to use a dosing device operating according to the invention-specific process in connection with a known industrial robot for highly precise dosing of the liquid or pasty medium, for which robotic control presets signals for the running speed and/or position of the robot in short time intervals and with no lead time, from which a conversion unit contained, for example, in the electronic control and regulation device of the invention-specific dosing device, computes the pertinent volume flow setpoint values.

Other features which are considered as characteristic for the invention are set forth in the appended claims.

Although the invention is illustrated and described herein as embodied in process for controlling a dosing device for liquid or pasty media, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a schematic depiction of a novel dosing device mounted to a partially illustrated arm of an industrial robot.

DETAILED DESCRIPTION OF THE INVENTION

Figure 1:
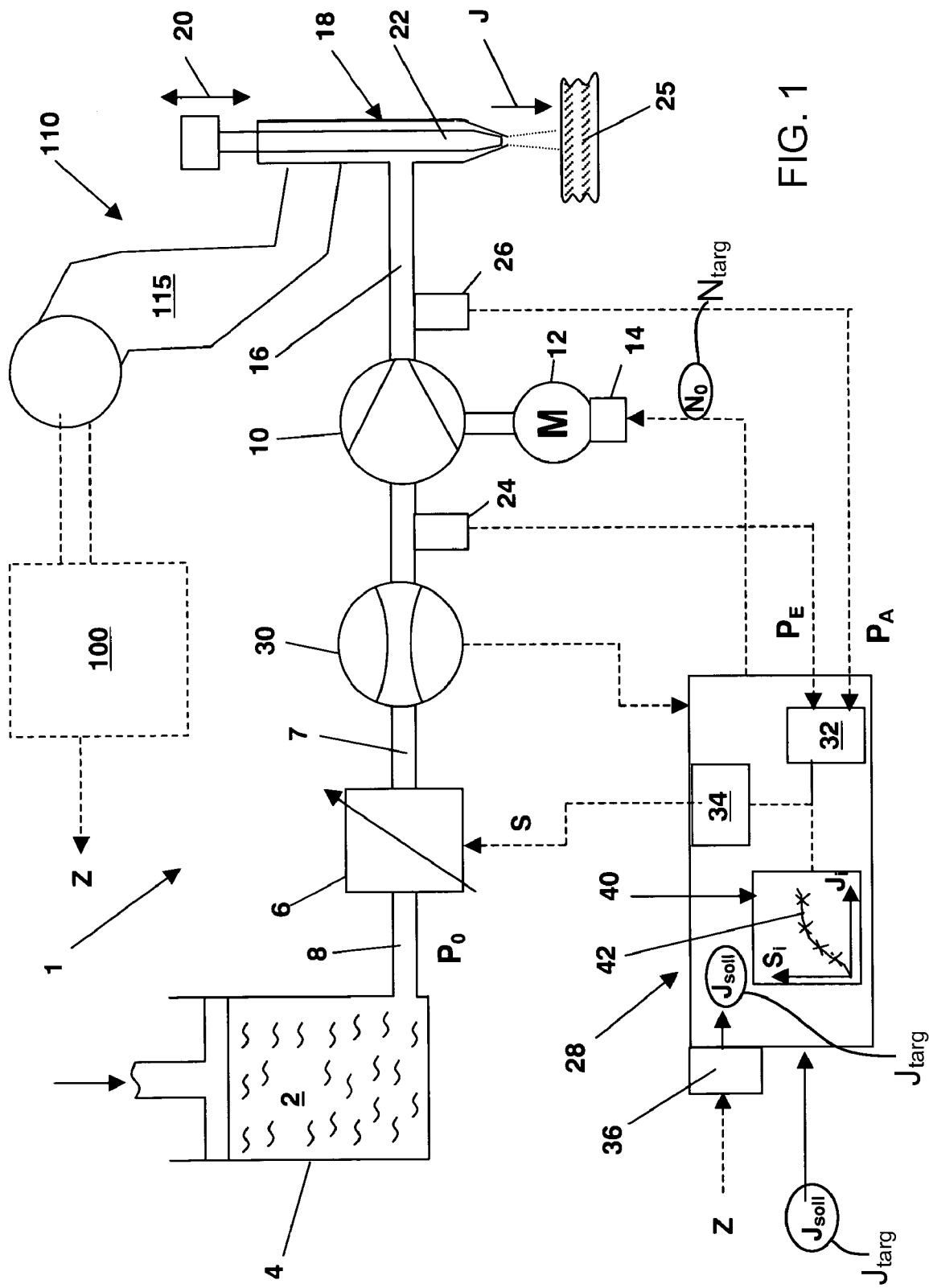

Referring now to the sole FIGURE of the drawing in detail a novel dosing device 1 according to the invention for the precise dosing of a pasty or liquid medium 2 which is made available via a feed device in the form of a pressurized storage container 4 with an input pressure $P_O$ comprises a pressure regulating valve 6, which is connected in flow terms with the storage container 4 by a conduit 8.

The dosing device 1 additionally has a dosing pump 10 connected with the outlet of pressure regulating valve 6 via a supply conduit 7, which is driven by an electric motor 12 with a speed governor 14 inserted. The speed governor 14 may also be referred to as a speed regulator or a closed-loop speed controller. The dosing pump 10 on the outlet side is flow-connected via a conduit 16 with an outlet valve 18, which in the embodiment form of the invention shown in the FIGURE, is embodied as an example as a needle valve, whose opening cross section can be altered by means of a needle 22 that can be moved in the direction of the arrow 20, to be able to adapt the size of the volume flow J issued from outlet valve 18 to a work piece 25 to the admission pressure $P_O$ in storage container 4 or the operating point of dosing pump 10. The volume flow J, i.e., the volume of medium 2 emerging per unit of time is indicated symbolically in FIG. 1 by the arrow in the area of outlet valve 18.

As can be gleaned by the depiction of FIG. 1, upstream of dosing pump 10 a first pressure sensor 24 is placed, and downstream of same a second pressure sensor 26, each of which is connected to the flow in the interior of the pertinent conduits 7 and 16, and which provide a first inlet-side pressure value $P_E$ and second outlet-side pressure value $P_A$ corresponding to the pressure of medium 2.

The first and second pressure values $P_E$ and $P_A$ are transmitted by supply lines not designated in greater detail to a control and regulating device 28 (open-loop and closed-loop controller 28), preferably electronic, which likewise is connected by appropriate electric lines drawn as dashes to pressure regulating valve 6 embodied as a pressure governor valve, to speed sensor 14 (i.e., rpm sensor) of drive motor 12 and to an optional flow measurement cell 30, the latter being able to detect the volume flow J to avoid systematic measurement errors when operating dosing device 1.

As additionally is shown by FIG. 1, control and regulating device 28 has a comparison unit 32, that compares the amounts of the first and second pressure values $P_E$ and $P_A$ with each other, and transmits the result of the comparison to a control unit 34 likewise contained in control and regulation device 28, which thereupon raises the adjustment signal S transmitted to pressure regulating valve 6 by a certain amount until the difference between the first pressure value and the second pressure value corresponds to a preset value, if the first pressure value $P_E$ is smaller than the second pressure value $P_A$.

In the same way, control unit 34 lowers the adjusting signal S transmitted to pressure regulating valve 6 by a certain, preferably selectable amount until the first pressure value $P_E$ corresponds for example to the second pressure value $P_A$ to eliminate the slippage of dosing pump 10, if the first pressure value $P_E$ is greater than the second pressure value $P_A$.

As can further be gleaned from the depiction of FIG. 1, an adjusting signal S is transmitted to control and regulation device 28 either by means of an input device not shown in greater detail such as a potentiometer or the like, or preferably by an electronic control device 100 of a robot 110 indicated by a dashed line—of which only the arm 115 guiding the outlet valve 18 is shown—which [signal] depending on the position and speed of the robot 110 can be temporally altered, and on the basis of which a conversion unit 36 either inserted or contained in control and regulation device 28, generates the volume flow setpoint value $J_{targ}$.

The control and regulation device 28 contains a storage device 40, preferably a digital one, in which value pairs from different volume flow values or volume flow setpoint values $J_i$ and values $S_i$ assigned to these values are stored, in which the difference between the first and second pressure values $P_E$ and $P_A$ corresponds to the pre-set value, particularly zero. The value pairs here are preferably stored in the form of a characteristic curve 42, as is indicated schematically in the FIGURE by the crosses.

To obtain as rapid an adaptation as possible of the de facto volume flow J emerging from outlet valve 28 to the new volume flow setpoint value $J_{targ}$ transmitted to control and regulation device 28, the control unit 34 reads the stored value corresponding to the new volume flow setpoint value $J_{targ}$ for volume flow $J_i$ together with the pertinent value $S_i$ from storage device 34, and feeds it as well as a new speed setpoint value $N_{targ}$ proportional to volume flow setpoint value $J_{targ}$ based on no pump slippage, preferably simultaneously to pressure regulating valve 6 and speed sensor 14, correspondingly.

The invention claimed is

1. A method of controlling a dosing device for a liquid or pasty medium, the method which comprises:
   conveying the medium by a feed device having a predetermined admission pressure and by a pressure regulating valve, downstream of the feed device in a direction of flow, to a dosing pump that is driven by a drive motor having a predetermined speed; and
   conveying the medium with the dosing pump to an outlet valve, and issuing the medium from the outlet valve as a temporally changeable volume flow;
   detecting a first pressure value of the medium upstream of the dosing pump;
   detecting a second pressure value of the medium downstream of the dosing pump;
   comparing the first pressure value and the second pressure value and altering a setting of the pressure-regulating valve so that a difference between the first pressure value and the second pressure value is driven to a predetermined value;
   storing, in the form of a characteristic curve, value pairs of different setpoint values of the volume flow and of respectively associated values of an adjustment signal transmitted to the pressure-regulating value at which the difference between the first pressure value and the second pressure value corresponds to the predetermined value; and
   altering the speed of the drive motor in dependence on a volume flow setpoint value, and altering an associated adjustment signal transmitted to the pressure regulating valve simultaneously with the volume flow setpoint value on the basis of the characteristic curve.

2. The method according to claim 1, which comprises conveying the medium to the outlet valve with a gearwheel pump.

3. The method according to claim 1, wherein the predetermined value for the difference between the first and second pressure value of the medium upstream and downstream of the dosing pump corresponds to zero bar.

4. The method according to claim 1, wherein the characteristic curve comprises value pairs from differing volume flow setpoint values and values associated therewith for the adjustment signal transmitted to the pressure regulating valve, in which the difference between the first pressure value and the second pressure value of the medium corresponds to the predetermined value.

5. The method according to claim 1, which comprises developing the characteristic curve empirically.

6. The method according to claim 1, which comprises independently supplementing a characteristic curve for a value pair not contained in the characteristic curve for a volume flow setpoint value.

7. The method according to claim 4, which comprises replacing the value pairs and/or the values assigned to the volume flow setpoint values of the characteristic curve for the adjustment signal during current operation of the dosing device by newly obtained values for updating the characteristic curve.

8. The method according to claim 1, which comprises supplementing the characteristic curve between two pairs of values through interpolation.

9. The method according to claim 1, wherein the pressure regulating valve is a closed-loop pressure regulating valve configured to independently regulate the admission pressure, in case of pressure oscillations in the feed device, to a substantially constant value.

10. The method according to claim 1, which comprises additionally detecting the volume flow of the medium by a flow measurement cell provided upstream of the dosing pump to ensure high process safety.

11. A dosing device for carrying out the method according to claim 1, comprising:
   a feed device for a liquid or pasty medium, said feed device providing the medium with a preset admission pressure;
   a pressure regulating valve fluidically connected with said feed device;
   a dosing pump fluidically connected with said pressure regulating valve;
   a first pressure sensor disposed to detect a inlet-side pressure of the medium upstream of said dosing pump;
   a second pressure sensor disposed to detect an outlet-side pressure of the medium downstream of said dosing pump;
   a drive motor disposed to drive said dosing pump;
   an outlet valve fluidically connected with said dosing pump and configured to issue the medium in a temporally changeable volume flow;
   a control and regulating device connected to transmit an adjustment signal to said pressure regulating valve in dependence on a pre-set volume flow setpoint value, said control and regulation device containing:
      a comparison unit for comparing the pressure values detected by said first and second pressure sensors;
      a control unit for altering the adjustment signal transmitted to said pressure regulating valve so that a difference between the first pressure value and the second pressure value corresponds to a pre-set value;
      a storage device storing characteristic curves containing value pairs from differing volume flow setpoint values and values assigned thereto for the adjustment signal for which the difference between the first and second pressure value corresponds to the pre-set value; and
   wherein said drive motor includes a speed regulator, and said control and regulation device transmits to said speed regulator a speed setpoint value associated with the volume flow setpoint value; and
   wherein, upon input of a new volume flow setpoint value, said control and regulation device simultaneously transmits a pertinent adjustment signal and the speed setpoint value corresponding to the altered volume flow setpoint value, to said pressure regulating valve and to said speed regulator.

12. The dosing device according to claim 11, wherein said control unit is configured to drive the difference between the first pressure value and the second pressure value to zero.

13. The dosing device according to claim 11, wherein said dosing pump is a toothed-wheel pump.

14. An industrial robot, comprising:
   a robot control device;
   a dosing device according to claim 11; and
   wherein the volume flow setpoint value transmitted to the control and regulation device is generated on the basis of a position- and/or velocity-dependent signal output by said robot control device.

15. The industrial robot according to claim 14 configured for applying adhesives or thickeners.

* * * * *